Patented Jan. 1, 1929.

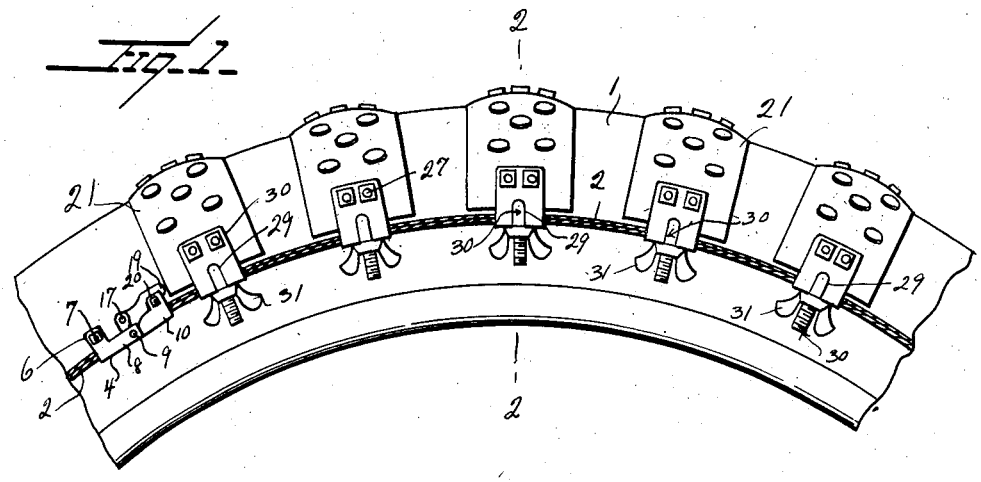
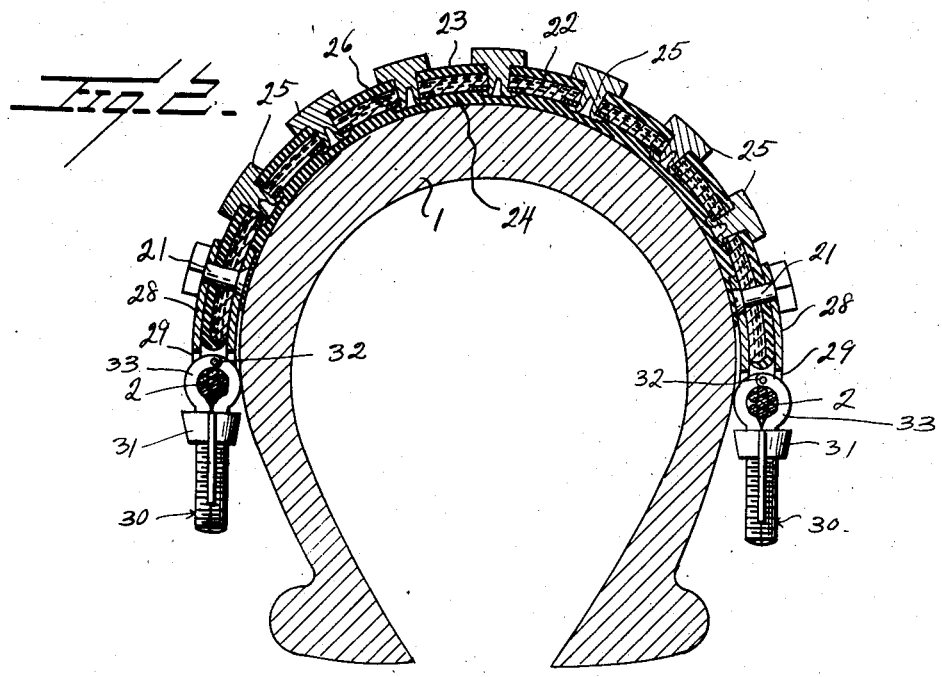

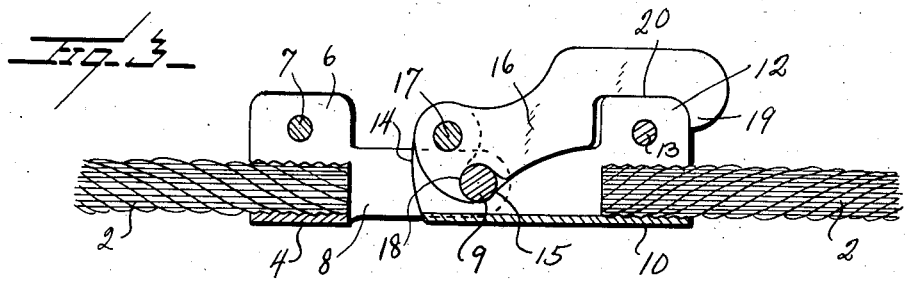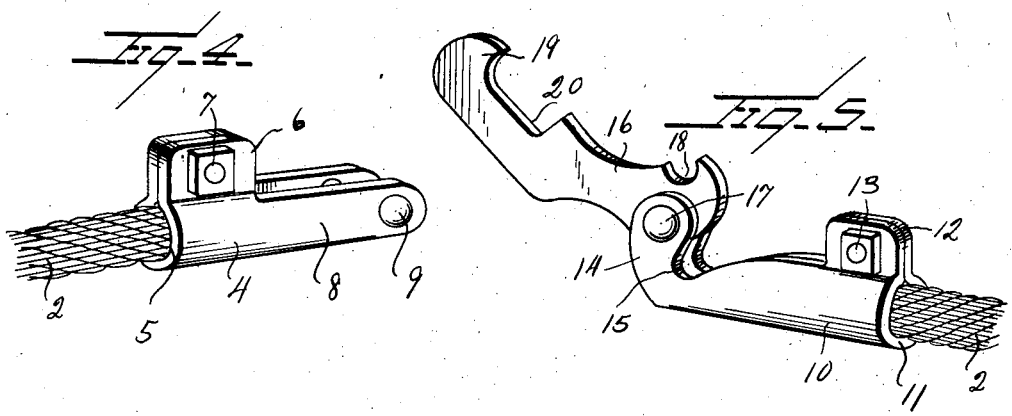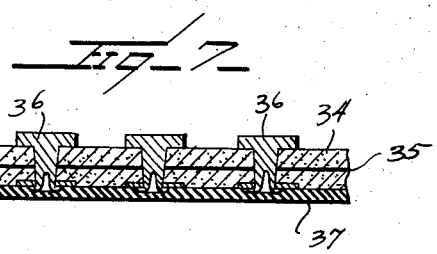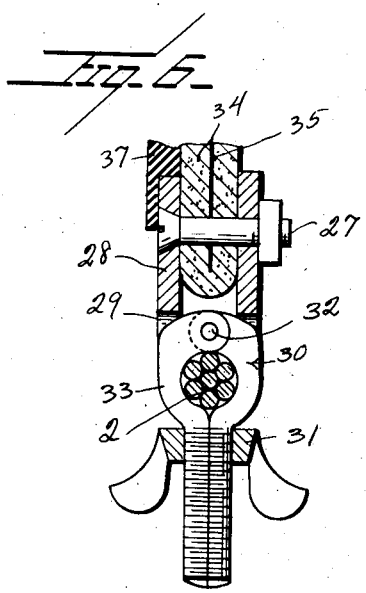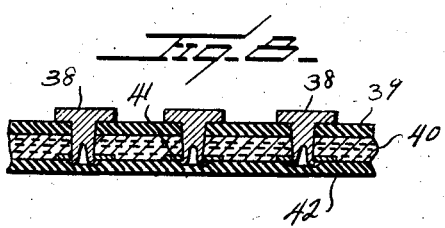

1,696,903

UNITED STATES PATENT OFFICE.

ANTOINE E. COURTADON, OF AKRON, OHIO.

GRIP ROAD TIRE PROTECTOR.

Application filed December 1, 1923, Serial No. 678,008. Renewed May 19, 1928.

This invention relates to new and useful improvements in anti-skid devices for vehicle wheels and more particularly to combined anti-skid devices and tire armors.

The principal object of the invention is to provide an anti-skid device of this character which will not only prevent lateral slipping of the vehicle and increase its tractive qualities but which will also protect the tire, preventing blow outs, punctures, stone bruises and cuts, thereby prolonging the life of the tire and at the same time preventing accidents by skidding.

A further object of the invention is the provision of a novel form of anti-skid device in which the anti-skid armor elements are all interchangeable and conveniently attached and detached without tools and so connected that they may be arranged to completely cover the tire and thereby utilized as an armor or to cover portions of the tire at predetermined intervals so that they may be used merely to increase the traction and prevent skidding.

Another object of the invention is the provision of a novel form of fastening whereby the tread sections may be simply and conveniently connected or disconnected from the attaching cables without tools so that the operator of the vehicle may, at any time, add to or detract from the number of tread sections or replace any worn section.

A still further object of the invention is to provide an anti-skid device having all the desirable features of anti-skid chains, none of their undesirable features and which will not destroy or materially damage the road bed.

The invention consists in the details of construction and in the combination and arrangement of the several parts of my improved tire protector whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary side elevation of an anti-skid device constructed in accordance with an embodiment of my invention;

Figure 2 is a section on the line 2—2 of Figure 1, somewhat enlarged;

Figure 3 is an enlarged longitudinal view of a part of the cable and connectors as disclosed in Figure 1;

Figure 4 is a perspective view of a connector at one end of the cable;

Figure 5 is a similar view of the connector at the opposite end of the cable;

Figure 6 is an enlarged detail vertical section showing the instrumentalities serving to connect the tread section with the cables;

Figure 7 is an enlarged detail sectional view of a modified form of the tread section;

Figure 8 is an enlarged detail sectional view of a further modified form of tread section.

Referring more particularly to the drawings, 1 represents a tire casing shown in Figure 2 to be the ordinary clincher type and which has extending around upon opposite sides thereof the cables 2. These cables, of course, may be of any suitable type, but I preferably employ, as is illustrated herein, a twisted or plaited wire cable of suitable dimensions to withstand the strain to which they are subjected.

One end of the wire has clamped thereto a connector 4 constructed of a single sheet of metal formed at one end into an internally threaded cylinder 5 having laterally projecting clamping ears 6 through the clamping bolt 7 is passed. At the opposite end of the connector from the cylinder 5 the same is provided with parallel separated legs 8 connected together adjacent their terminal by a bolt or rivet 9.

The opposite end of the cable has secured thereto a connector 10 formed of a single sheet of material provided at one end with an internally threaded cylinder 11 arranged to receive the cable and laterally extending clamping ears 12 through which the clamping bolt 13 is passed. The forward or outer end of the connector 10 is provided with spaced transversely extending hooks or ears 14 at the juncture of which with the body of the connector are formed bolt receiving notches 15. The outer ends of the ears 14 are spaced apart to receive the latching member 16 which is pivotally mounted between the ears upon the rivet 17. This latching member is also provided with a notch 18 arranged at one side of the pivot point and a hooked end 19 which defines one side of a notch 20, the purpose of which will be hereinafter described.

In connecting the ends of the cables together, the hook 16 is passed between the legs 8 and between the body and the rivet 9 until the bolt or rivet 9 engages in the notch 18 of the latching member. The latching member is then thrown over toward the cylinder 11 of the connector 10 so as to bring the bolt 9 in the notches 15, as clearly shown in Figure 3, with the hooked end 19 engaged over the ears 12 which are positioned in the notch 20. In this manner, the ends of the cables are effectively connected, but at the same time connected in such a manner that they may be readily disconnected without tools. In practice, I preferably arrange to have the ears 12 engage the inner wall of the notch 20 before the walls of the notch 18 align with the walls of the notches 15 so that the strain on the cable has a constant tendency to maintain the latching member 16 in locked position.

Secured to the cable at intervals by means which will be hereinafter described, are the tread sections, generally indicated at 21. These tread sections, as shown in Figures 2 and 8, comprise an intermediate layer of fabric 22, an outer layer of rubber 23, and an inner layer of rubber 24. Secured in the tread sections in any suitable number are the hollow rivets 25 which pass through the outer layer of rubber 23 and through the intermediate layer of fabric where they are headed up against washers 26, as shown in Figure 2. In this position, the inner layer of rubber prevents their contact with the tire casing, as will be readily understood. As shown, these rivets are provided with external heads or studs of suitable diameter and contour which are arranged to engage the road surface to secure traction and prevent skidding.

Each tread section has secured to each terminal by means of headed rivets 27 the U-shaped cable receiving loop 28 provided with a longitudinal slot 29 extending across the bed of the U, as can be seen from an inspection of Figures 1 and 6. Positioned in the slots and surrounding the cables are the split screw eyes 30 which have mounted upon them the thumb or wing nuts 31, as shown in Figure 6. These screw eyes each comprise separate halves pivoted together at 32, and each half is provided with a leg semi-circular in cross section which, when connected together, form a perfectly circular screw-threaded shank arranged to receive the thumb or wing nuts 31. If desirable, the legs may be slightly tapered so as to be thicker at their inner ends than at their outer ends whereby the thumb nut when screwed up thereon will cause the legs to be brought together and effectively clamp the opposite halves or jaws 33 together. The members 30 being clamped upon the cable and positioned in the slots 29 absolutely prevent any slippage of the tread sections upon the cable, but it will be readily seen that by loosening the thumb or wing nuts 31 or removing the same and separating the legs of the split screw eyes that the tread sections can be shifted upon the cable to adjust their position relative to one another so that they may be all equally spaced or so that a greater or lesser number of the tread sections may be attached to the cable.

In Figure 7, I have shown a modified form of tread section which embodies a plurality of layers of leather 34 cemented together, as shown at 35, and having secured therein the headed rivets 36. These rivets are similar to the rivets shown in Figure 2 and have their inner ends effectively concealed by an inner layer of rubber or other suitable material, indicated at 37, which effectively prevents contact of the inner ends of the rivets with the tire casing.

From the foregoing description it is thought to be obvious that a tire protector constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

What I claim is:

1. A detachable armor tread for pneumatic tires including a fabric body, a layer of rubber on the outer face of the fabric body, a plurality of studs extending through the layer of rubber and fabric body, said studs being provided with heads seating against the layer of rubber, an inner facing layer of plastic material secured to the inner face of the fabric body to form a cover for the inner ends of the studs and means for holding the tread in applied position upon a tire.

2. In a detachable armor tread for pneumatic tires, a fabric body portion consisting of a plurality of plies of fabric, an outer facing layer of rubber, an inner facing layer of elastic non-fabric material, studs having shanks which extend through the outer facing layer of rubber through the fabric body portion, the inner ends of said studs being headed to prevent the withdrawal of the studs from the tread and being covered by the inner facing layer, said studs being provided with head members which rest upon the outer facing layer whereby they are exposed for engagement with the ground, the shanks of said studs being hollow and means for holding the tread in applied position upon a tire.

3. A detachable armor tread for vehicle tires comprising a plurality of layers of material, studs passing through the layers and being headed against washers abutting the inner surface of the inner layer, a facing layer of rubber covering the inner layer of material and the headed ends of the studs and means for holding the tread in applied position upon a tire.

In testimony whereof I hereunto affix my signature.

ANTOINE E. COURTADON.